United States Patent
Koshikawa et al.

[11] Patent Number: 5,966,277
[45] Date of Patent: Oct. 12, 1999

[54] MAGNETIC HEAD AND METHOD FOR PRODUCTION THEREOF

[75] Inventors: Takao Koshikawa; Atsuhiko Nagai, both of Kanagawa, Japan

[73] Assignee: Fujitsu Limited, Kawasaki, Japan

[21] Appl. No.: 08/999,285

[22] Filed: Dec. 29, 1997

[30] Foreign Application Priority Data

Apr. 25, 1997 [JP] Japan .................................. 9-109845
Dec. 19, 1997 [JP] Japan .................................. 9-350593

[51] Int. Cl.⁶ .................................. G11B 5/31; G11B 5/39
[52] U.S. Cl. .................................. 360/126; 360/113
[58] Field of Search .................................. 360/113, 122, 360/123, 126

[56] References Cited

U.S. PATENT DOCUMENTS 5,559,653  9/1996  Shouji et al. .......................... 360/126
5,793,578  8/1998  Heim et al. ............................ 360/126

FOREIGN PATENT DOCUMENTS 5303719  11/1993  Japan .
6349026  12/1994  Japan .
 850705   2/1996  Japan .

Primary Examiner—John H. Wolff
Attorney, Agent, or Firm—Greer, Burns & Crain Ltd.

[57] ABSTRACT

A magnetic head comprising a lower magnetic pole formed on a wafer, a nonmagnetic write gap layer formed on the lower magnetic pole, an upper magnetic pole formed on the nonmagnetic write gap layer and provided with a pole tip possessing a thin leading end, two depressed parts formed in the lateral directions from directly below the lateral sides of the pole tip and opposed to each other across areas equal in width with the pole tip, a protective layer of a nonmagnetic insulating material adapted to fill the depressed parts and, at the same time, cover the upper magnetic pole and the lower magnetic pole, and a coil nipped between the opposed parts of a nonmagnetic insulating layer interposed between the upper magnetic pole and the lower magnetic pole.

5 Claims, 12 Drawing Sheets

MAGNETIC HEAD AND METHOD FOR PRODUCTION THEREOF

BACKGROUND OF THE INVENTION

1. Field of the Invention

This invention relates to a magnetic head and a method for the production thereof. More particularly, this invention relates to a magnetic head for use in a magnetic disk drive or a magnetic tape drive and a method for the production thereof.

2. Field of the Invention

The magnetic disk drive or the magnetic tape drive has come to be improved markedly in track density in consequence of the increase in the device's recording density and, therefore, is in need of a magnetic head which features a narrow core width and suffers only sparing recording obscurity. Particularly when the MR head (magnetoresistive head) which has been finding growing acceptance is to be used, since shared use of a magnetic layer of a large width destined to form a magnetic shield for the MR head as one of the two recording magnetic poles opposed to each other across a recording write gap layer is popular and also is liable to aggravate recording obscurity, it is preferred to adopt a magnetic head which suffers only sparing recording obscurity and enjoys a perfect off-track characteristic.

It is known that equalization of the upper and lower recording magnetic poles in width is effective in realizing such a magnetic head featuring a narrow core width and suffering only sparing recording obscurity as mentioned above. Various methods have been proposed for the production of magnetic heads of this description.

An example of trimming a magnetic pole from the air bearing surface (ABS), i.e. the face opposite a magnetic medium, side with a focused ion beam (FIB) will be cited. The magnetic head disclosed in JP-A-03-296,907, for example, is claimed to be a magnetic head of a perfect off-track characteristic which is obtained by trimming the upper and lower magnetic poles with the fib from the air bearing surface (abs) side of the magnetic head.

Figure 1A:
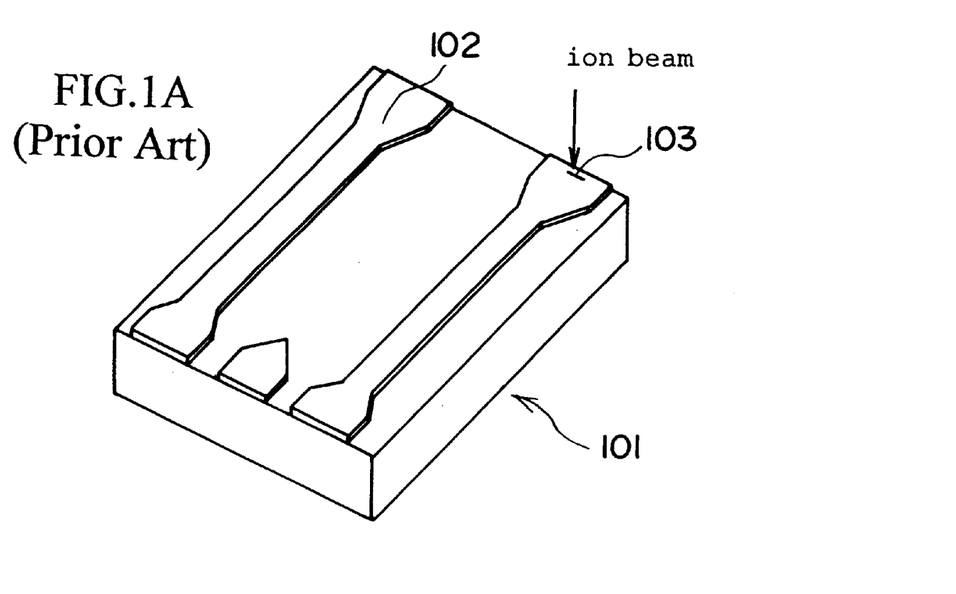
FIGS. 1A–1C are perspective views illustrating one example of trimming an upper magnetic pole in a conventional magnetic head.
Figure 1B:
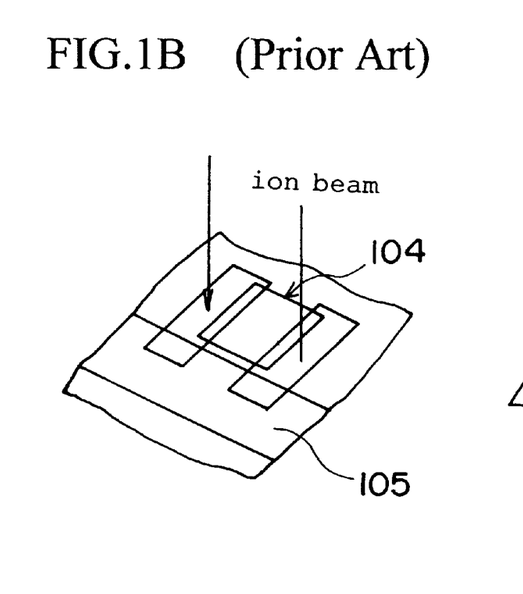
Figure 1C:
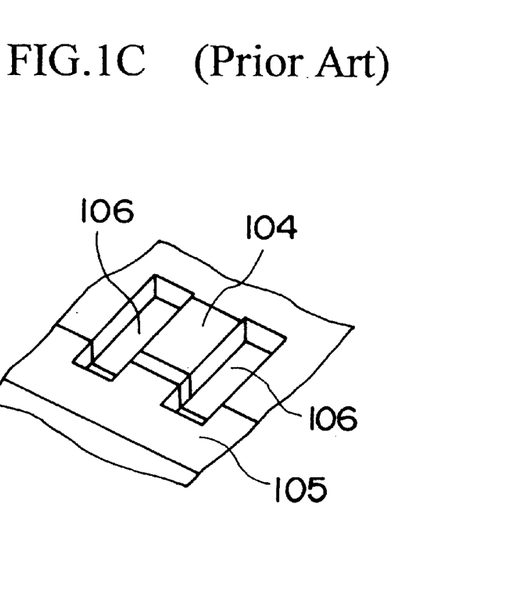

Specifically, after a slider 101 possessed of a rail face (air bearing surface (ABS)) 102 is formed as illustrated in FIG. 1A, the lateral part of an upper magnetic pole 104 of a magnetic head 103 formed on the slider 101 is trimmed by exposure to a focused ion beam and, at the same time, the upper layer part of a lower magnetic pole 105 is simultaneously trimmed to equalize the lower magnetic pole 105 and the upper electrode 104 in width as illustrated in FIGS. 1B and 1C.

Besides this method, the method which comprises forming the upper magnetic pole and subsequently trimming the lower magnetic pole as by ion milling with the upper magnetic pole itself as an etching mask during the course of a wafer process has been known. Since this method avoids adjusting the width of the upper magnetic pole by the trimming, the accuracy of the width of the upper magnetic pole depends on the accuracy of a plating pattern to be used for the formation of the upper magnetic pole.

The method which effects the trimming of the upper magnetic pole 104 and the lower magnetic pole 105 as illustrated in FIGS. 1A–1C, however, entails the following problems.

First, since the exposure to the focused ion beam is carried out after a given wafer has been cut into blocks and the rail face 102 has been formed on such a block, the handling of the substrate and the location of the focused ion beam are complicated. Further, this method is highly problematic in terms of reliability because depressions 106 formed in the rail face 102 as illustrated in FIG. 1C are fated to collect dust and lubricant therein when the rail face 102 contacts the face of the recording medium in the contact start and stop (CSS) area.

JP-A-03-296,907 (KOKAI) teaches to cope with this problem by filling the depressions with a nonmagnetic material. The work of filling the depressions itself is very difficult because the substrate on which the rail face is fabricated is no longer a wafer but a small block.

Further, the edges of the depressions which are formed by the focused ion beam are liable to form R's, approximately 0.1–0.2 μm in size. This size of the R's does not deserve to be ignored when the core width approximates closely to 1 μm.

Moreover, since the FIB electrically charges the rail face 102 being fabricated unless this face completely undergoes a treatment for electric neutralization, it inevitably breaks the MR element which is vulnerable to static electricity.

The method which consists in coping with this problem by subjecting the magnetic shield layer to ion milling with the upper magnetic pole as an etching mask during the course of wafer process has been known. Though this method allows easy handling of the substrate which has the unit size of a wafer, it is still at a disadvantage in inevitably etching parts other than the magnetic pole, suffering the redeposited film of the etched part to adhere to the lateral face of the magnetic pole, and rendering it difficult to improve the accuracy of core width.

SUMMARY OF THE INVENTION

This invention has for an object thereof the provision of a magnetic head which inhibits formation of any depression in the side opposed to a magnetic recording medium, withstands static charging strongly, and allows exaltation of the accuracy of the width of a magnetic pole and a method for the production thereof.

The present invention contemplates forming an upper magnetic pole on a wafer, then projecting a focussed ion beam in the direction of thickness of film thereby trimming the opposite lateral parts of the pole tip of the upper magnetic pole and, at the same time, forming depressed parts in the upper layer of a lower magnetic pole directly underlying the upper magnetic pole, and filling the depressed parts with a nonmagnetic protective layer.

When the wafer is divided so as to expose the leading end of the pole tip, therefore, the leading end of the pole tip and the vicinity thereof, namely the face of the magnetic head opposed to the magnetic recording medium, cannot suffer the occurrence of a depressed part. The face opposed to the magnetic recording medium does not allow easy adhesion of dust.

Since the upper magnetic poles and the lower magnetic poles still in the form of a wafer are simultaneously exposed to the focussed ion beam, at least one of the lower magnetic pole, the upper magnetic pole, and the plating conducting film on the wafer can be easily grounded. By this grounding, the magnetoresistive element, if existing under the lower magnetic pole, can be precluded from electrostatic breakdown.

Further, since the focussed ion beam is moved to the lateral part of the pole tip from outside, the material of the magnetic pole scattered by the impingement of the focussed ion beam does not easily adhere to the lateral part of the pole tip and, therefore, cannot degrade the accuracy of the width of the pole tip.

When the surface of the lower electrode directly underlying the pole tip of the upper magnetic pole is covered with a layer of a higher saturated magnetic flux density or higher resistance than in the other area, it is enabled to inhibit a change in signal due to magnetic saturation of the lower magnetic pole or prevent deterioration of the frequency characteristic due to eddy current.

When the area of the upper face of the lower magnetic pole which is opposed to the upper magnetic pole and the vicinity thereof are raised for the purpose of leveling the depressed part possibly formed in the lower magnetic pole in consequence of the exposure to the focussed ion beam, the possibility of the depressed part gaining the greatest depth in the part approximating most closely to the pole tip can be prevented. When a depressed part is preparatorily formed in the side area of the lower magnetic pole which is separated from the pole tip of the upper magnetic pole, this depressed part can be given an increased depth at the center and the possibility of the depressed part assuming the greatest depth in the area approximating most closely to the pole tip can be precluded.

DESCRIPTION OF THE PREFERRED EMBODIMENTS

The preferred embodiments of this invention will be described below with reference to the accompanying drawings.

FIGS. 2A–2F and FIGS. 3A–3F are cross sections illustrating the process for the production of the magnetic head of this invention. FIGS. 2A–2F are cross sections of the magnetic head as viewed from the part thereof opposed to the magnetic disk. FIGS. 3A–3F are cross sections of the magnetic head as viewed from the side in which the spiral coil of an inductive-write/MR-read composite type magnetic head is presented.

Figures 2A, 2B:
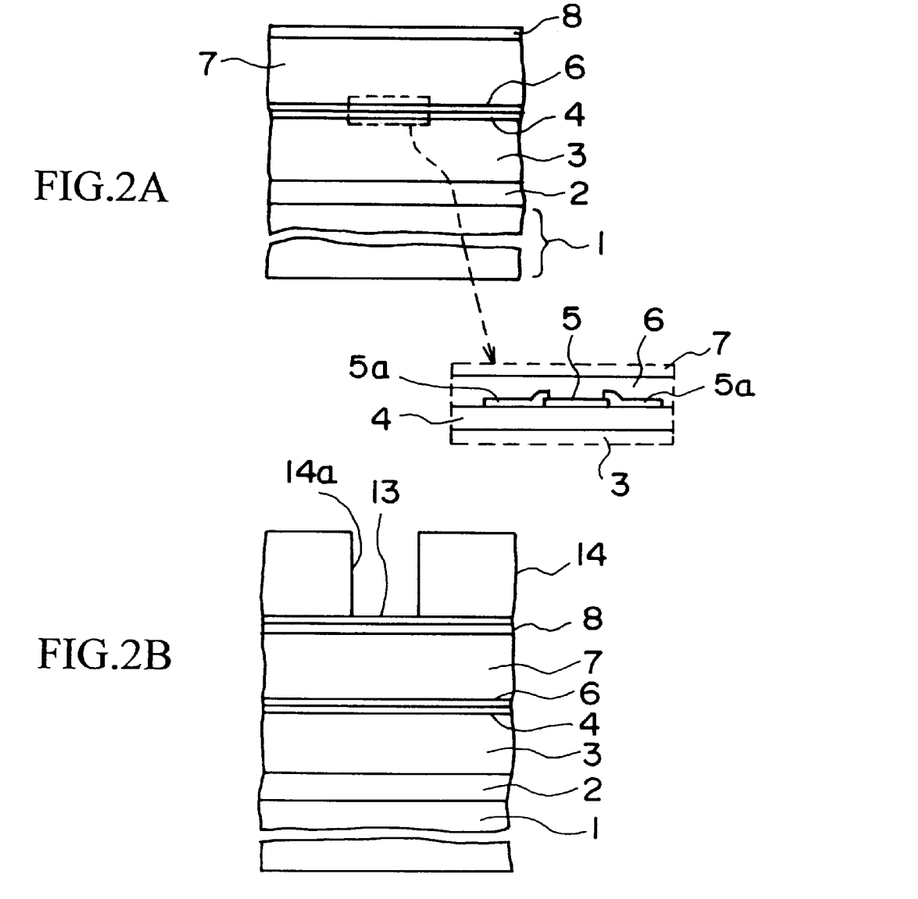
FIGS. 2A–2F are cross sections illustrating a process for the production of a magnetic head of this invention as viewed from the leading end of a magnetic head.

First, the process up to the step illustrated in FIG. 2A will be briefly described.

On a substantially disc-shaped wafer 1 made of such a material as alumina titan carbide ($Al_2O_3TiC$), ferrite, or calcium titanate, a substrate-protecting film 2 made of $Al_2O_3$, a lower magnetic shield layer 3 made of NiFe, and a first nonmagnetic insulating layer 4 made of $Al_2O_3$ are superposed.

Subsequently, a magnetic transducer 5 is formed on the first nonmagnetic insulating layer 4. The magnetic tranducers 5 are formed as split longitudinally and laterally on the upper face of the nonmagnetic insulating layer 4.

The magnetic transducer 5 may be an anisotropically magnetoresistive element or a spin valve magnetoresistive element, for example. A pair of leads 5a are connected to the opposite ends of the magnetic transducer 5 and they are drawn out on the first nonmagnetic insulating layer 4.

Further, on the first nonmagnetic insulating layer 4, s second nonmagnetic insulating layer 6 made of $Al_2O_3$ and adapted to cover the magnetic transducer 5 and the leads 5a is formed. An upper magnetic shield layer 7 made of NiFe is superposed on the second nonmagnetic insulating layer 6.

In the ensuant superposed layers, a write gap layer 8 having a thickness in the approximate range of 0.2–0.6 $\mu$m and made of $Al_2O_3$ is formed on the upper shield layer 7. The write gap layer 8 fulfills, in the part thereof opposed to the magnetic disk, a function of generating a magnetic flux for recording. Since the upper magnetic shield layer 7 in the induction coil type head is allowed to function as a lower magnetic pole, it will be occasionally referred to as "lower magnetic pole."

Figure 3A:
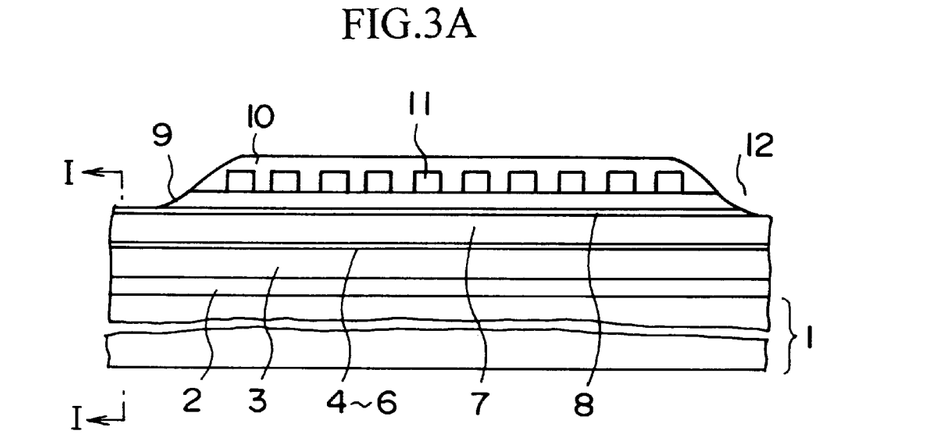
FIGS. 3A–3F are cross sections illustrating the process for the production of the magnetic head of this invention as viewed from the lateral part of a coil forming part of the magnetic head.

Then, on the write gap layer 8, a spiral coil 11 interposed between third and fourth nonmagnetic insulating layers 9 and 10 is formed as illustrated in FIG. 3A. The third and fourth nonmagnetic insulating layers 9 and 10 are formed of an thermaty hardened photoresist. A through hole 12 centrally piercing the spiral coil 11 is formed through the third and fourth nonmagnetic insulating layers 9 and 10 and the write gap layer 8. The third and fourth nonmagnetic insulating layers 9 and 10 and the spiral coil 11 are disposed at positions not opposed to the magnetic recording medium (such as, for example, a magnetic disk or a magnetic tape). The cross section taken through FIG. 3A along the line I—I is illustrated in a magnified scale in FIG. 2A.

Figure 3B:
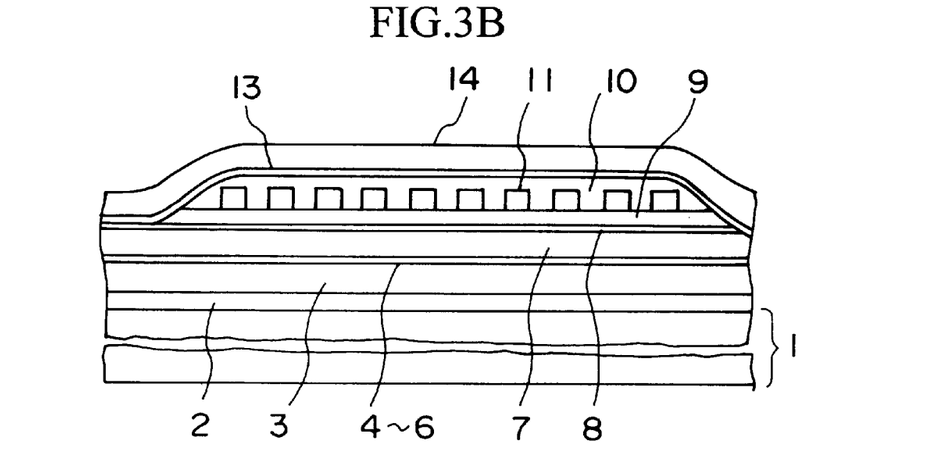

Thereafter, a plating base layer 13 made of NiFe is deposited such that it covers the fourth nonmagnetic insulating layer 10 and the write gap layer 8 and, at the same time, closes the hole 12 in the fourth nonmagnetic insulating layer 10 as illustrated in FIG. 2B and FIG. 3B. A photoresist 14 is spread on the plating base layer 13. By subjecting this photoresist 14 to exposure and development, a window 14a for opening an area for the formation of the upper magnetic pole is formed in the photoresist 14. The hole 12 is exposed again in consequence of the formation of this window 14a.

Figure 2C:
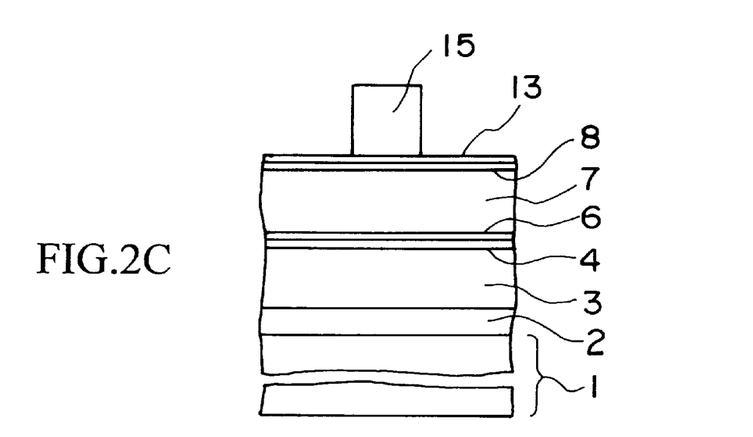
Figure 3C:
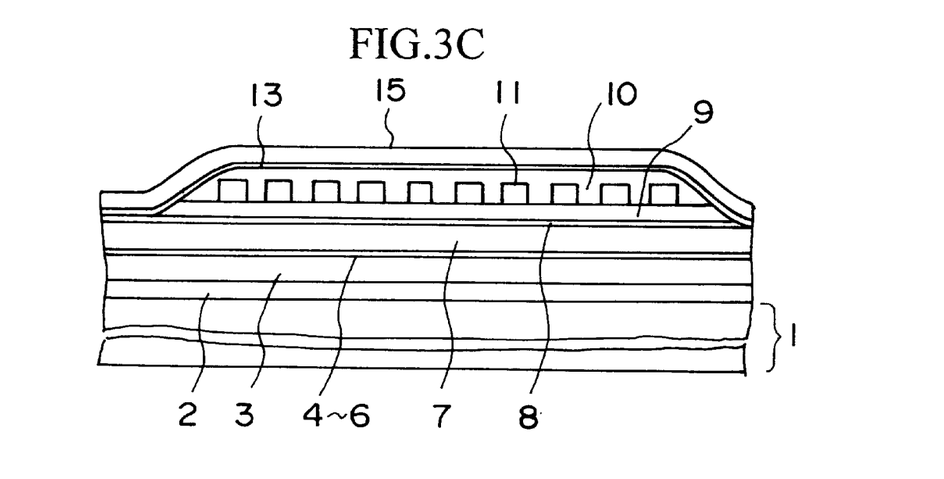
Figure 3D:
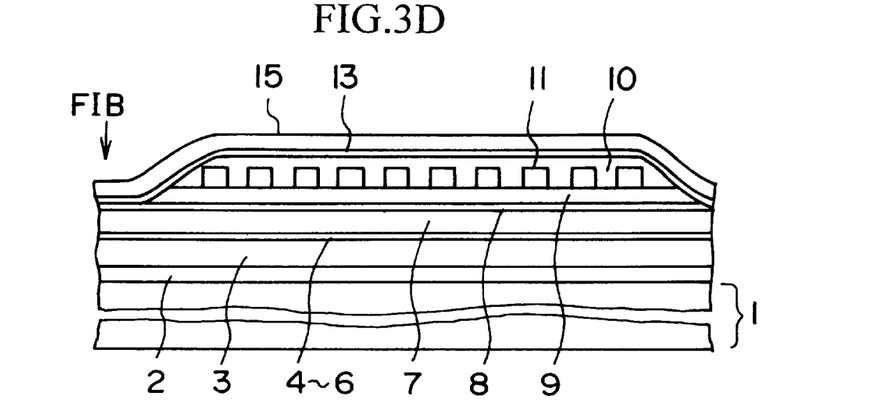
Figure 4A:
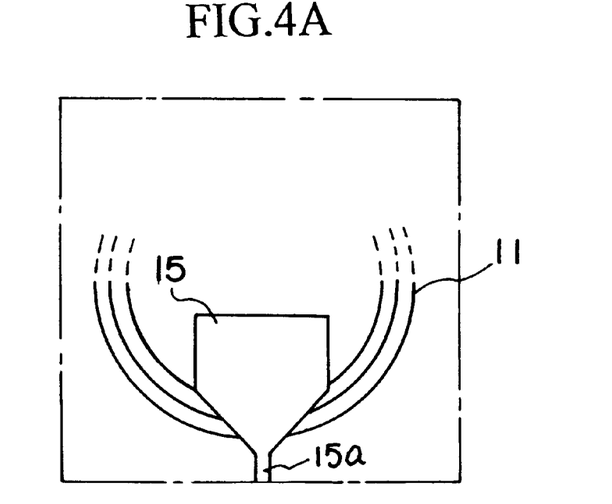
FIG. 4A is a plan view illustrating an upper magnetic pole and a spiral coil in the magnetic head and FIGS. 4B–4D are plan views showing the scanning direction of FIB during the course of trimming the upper electrode.

By the electro plating technique, an upper magnetic pole layer 15 of NiFe is formed in a thickness of several $\mu$m in the window 14a of the photoresist 14 as illustrated in FIG. 2C and FIG. 3C. The upper magnetic pole layer 15 in the window 14a, as illustrated in FIG. 4A, has a shape such that it possesses a slender pole tip 15a in the area opposed to the magnetic recording medium and the vicinity thereof and joins the lower magnetic pole 7 through the hole 12. Incidentally, the magnetic shield layers 3 and 7 and the upper magnetic pole 15 have the thicknesses thereof set in the approximate range of 2–4 μm. These components may be formed of such a Co-based alloy as CoNiFe besides the NiFe alloy mentioned above. When they are formed by the sputtering technique instead of the plating technique, an Fe-based alloy such as FeN or FeNZr or a Co-based alloy such as CoZr may be used.

If the upper magnetic pole 15 is formed by a sputtering technique, not the electro plating technique, the plating base layer 13 is not needed. The upper magnetic pole 15 formed by the sputtering technique is patterned by photolithography method.

When the photoresist 14 is subsequently removed, the upper magnetic pole 15 superposed on the photoresist 14 is concurrently removed from above the substrate and only the upper magnetic pole 15 inside the window 12 is left behind in such a shape as is illustrated in FIG. 4A.

Figure 2D:
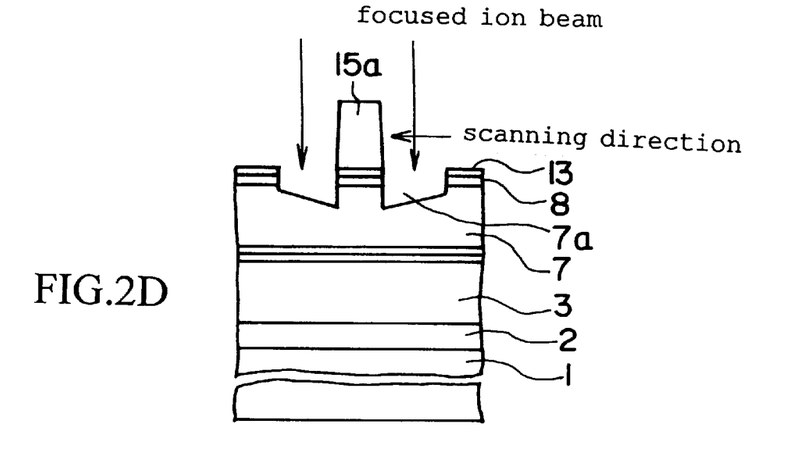
Figure 4B:
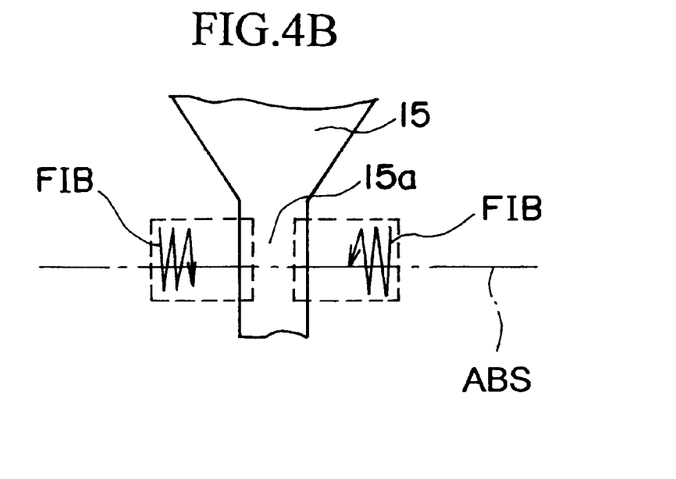

After the photoresist 14 has been removed with a solvent, the opposite lateral parts of the pole tip 15a of the upper magnetic pole 15 which contact s the write gap layer 8 and the upper layer part of the lower magnetic pole 7 are trimmed by the impingement of a focussed ion beam (FIB) as illustrated in FIG. 2D and FIG. 4B without dividing the wafer 1.

By this trimming, the width of the pole tip 15a of the upper magnetic pole 15 is adjusted to a necessary size and, at the same time, depressions 7a are formed in the upper layer parts of the lower magnetic pole 7 which exist one each on the opposite sides of the pole tip 15a.

Figure 4C:
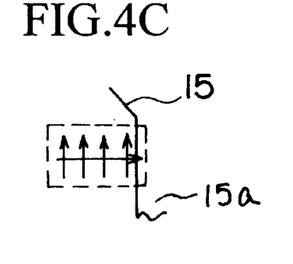
Figure 4D:
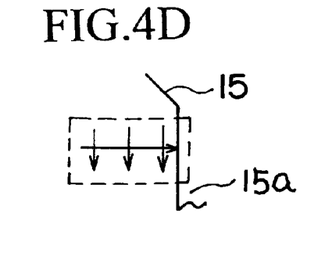

The exposure to the focussed ion beam is effected by causing the focussed ion beam FIB to be moved in the direction of the lateral faces of the pole tip 15a from outside the pole tip 15a as it is reciprocated meanwhile in the scanning manner in the direction of projection of the pole tip 15a as illustrated in FIG. 4B. The scanning motion of the focussed ion beam FIB, when produced unidirectionally as illustrated in FIG. 4C and FIG. 4D, produces the same effect as in the reciprocating pattern.

The reason for moving the focussed ion beam from outside the pole tip 15a as described above is that the possibility of such extraneous matter as the material of the magnetic pole scattered by the impingement of the focussed ion beam FIB adhering to the lateral face of the pole tip 15a and consequently degrading the accuracy of the width of the pole tip 15a must be precluded. If the focussed ion beam FIB is moved outward from the lateral face of the pole tip 15a, the material of the magnetic pole scattered by the FIB will inevitably adhere to the lateral face of the pole tip 15a and add substantially to the width of the pole tip 15a.

Figure 2E:
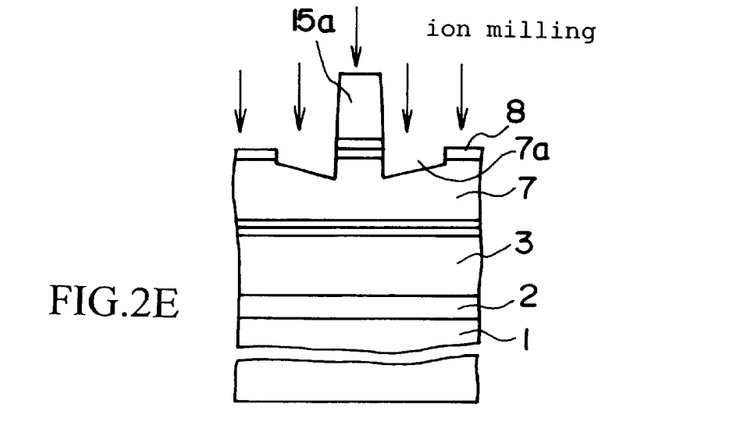
Figure 3E:
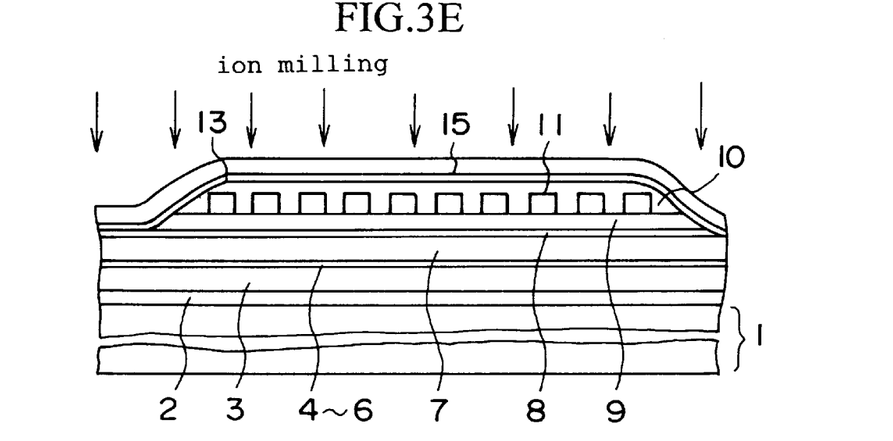

After the trimming treatment performed as described above is completed, the plating base layer 13 which is exposed in the area other than the upper magnetic pole layer 15a as illustrated in FIG. 2E and FIG. 3E is removed by an ion milling. This milling decreases the thickness of the upper magnetic pole layer 15 by the thickness of the plating base layer 13. Since the plating base layer 13 is formed of the same material as the upper magnetic pole 15, the upper magnetic pole layer 15 which has been thinned as described above is allowed to regain substantially the thickness which the upper magnetic pole 15 possessed at the initial time of its formation.

Figure 2F:
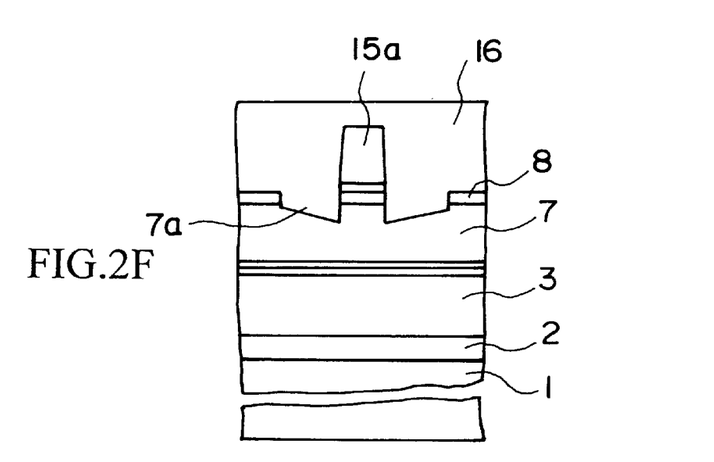
Figure 3F:
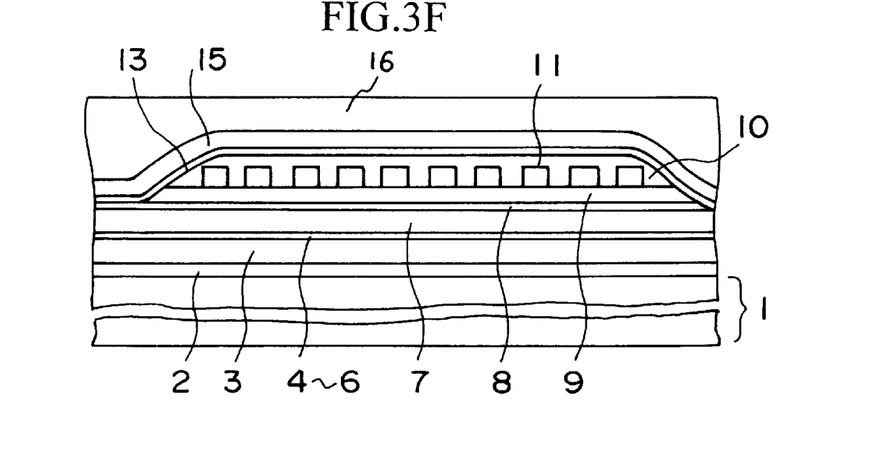

Thereafter, an electrode pad (not shown) which is connected to the transducer 5 or the coil 11 is formed. When a protective layer 16 of $Al_2O_3$ is subsequently formed throughout the entire area as illustrated in FIG. 2F and FIG. 3F, the depressions 7a in the lower magnetic pole layer (the upper magnetic shield layer) 7 which exist one each on the opposite sides of the pole tip 15a are completely filled by the protective layer 16.

This trimming treatment may be performed at any time after the formation of the upper magnetic pole and before the formation of the protective layer 16.

For example, the upper magnetic pole layer 15 is formed, the electro plating base layer 13 is removed, an other electro plating base layer for electrode pads is formed on the upper magnetic pole layer 15 and the around area thereof, the electrode pads are formed on the other electro plating base layer by electro plating technique, thereafter the FIB is irradiated to the pole tip 15a.

Figure 5A:
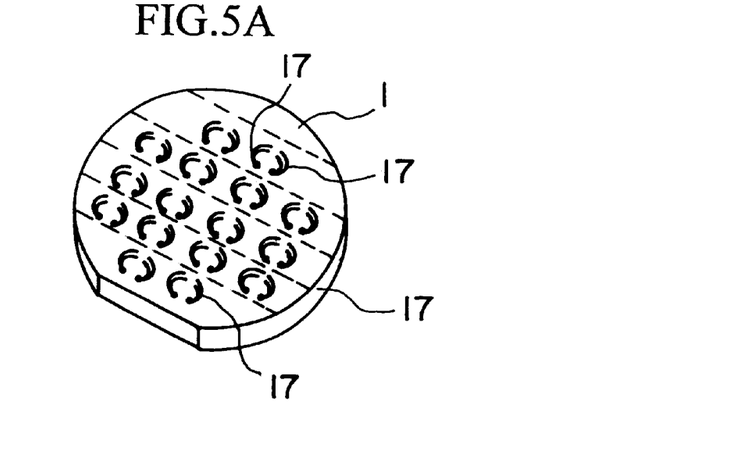
FIGS. 5A–5C are diagrams illustrating a process from the step of forming magnetic heads, through the step of splitting one of the magnetic heads in the form of a bar from the wafer, to the step of imparting the shape of a slider to the bar.
Figure 5B:
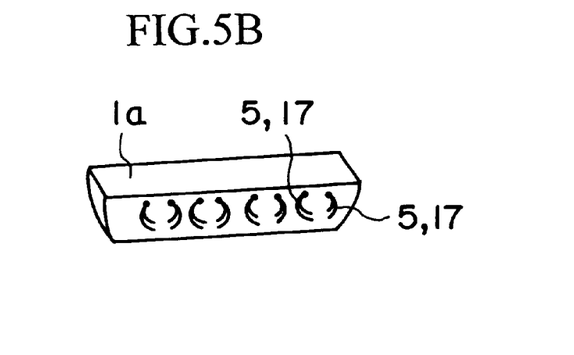
Figure 5C:
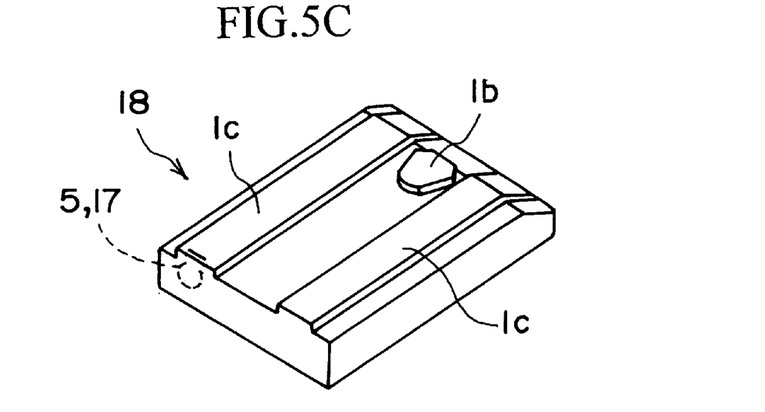

Since the steps described thus far are carried out before the wafer 1 is divided, an induction type magnetic heads 17 are formed as split each other on the wafer 1 as illustrated in FIG. 5A. Thereafter, the wafer 1 is divided into a plurality of ribbons 1a as illustrated in FIG. 5B and rail faces 1b and 1c are formed on each of the ribbons 1a and, subsequently, each of the ribbons 1a is separated from the wafer 1 to give rise to a slider 18.

Figure 6:
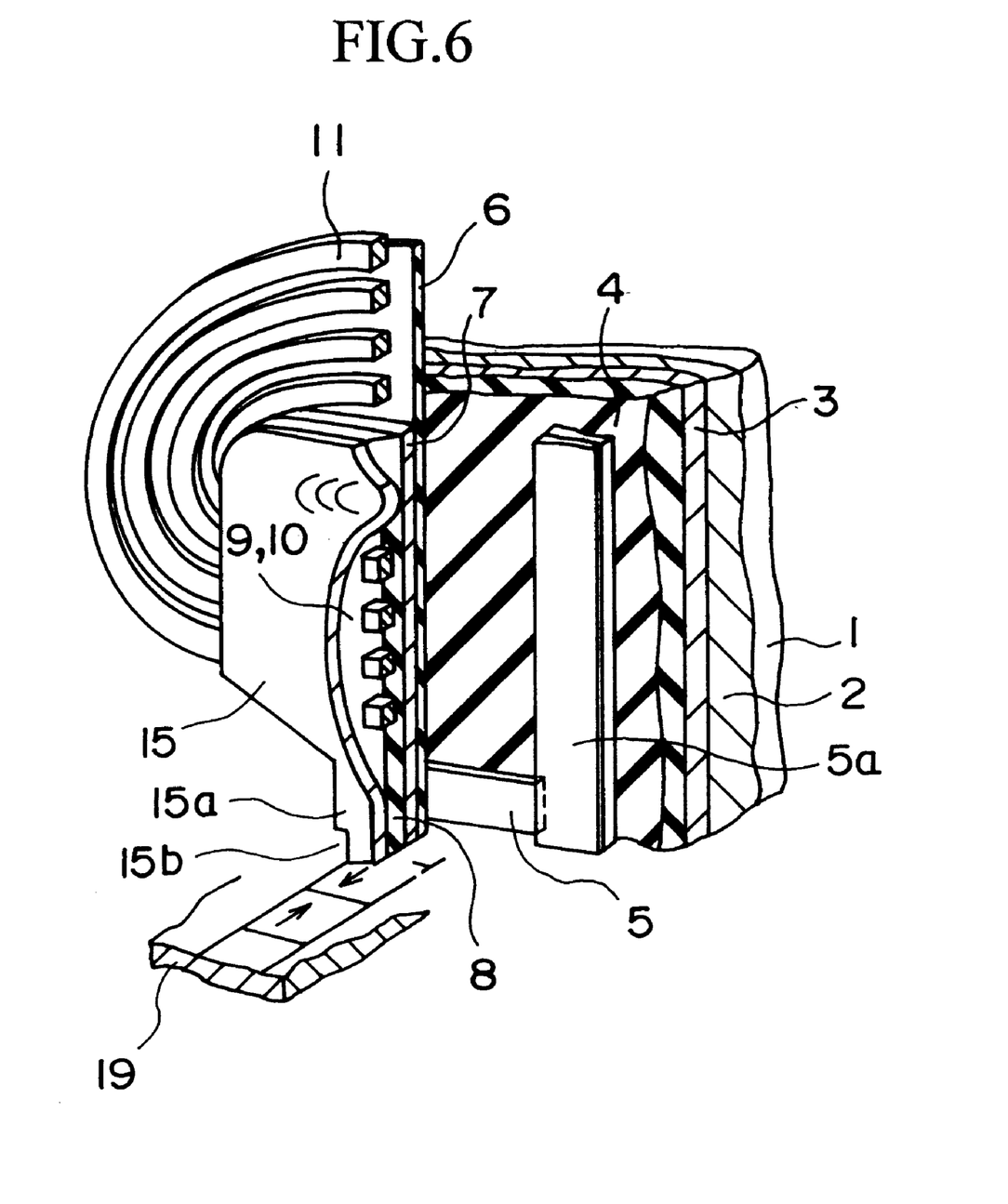
FIG. 6 is a perspective cross section illustrating the waist part of the magnetic head of this invention in a disassembled state.

The positional relation between the inductive-write/MR-read composite type magnetic head 17 and the transducer 5 is illustrated in the perspective view of FIG. 6. In FIG. 6, the reference numeral 15b represents an FIB-trimmed part of the pole tip 15a and the reference numeral 19 represents the magnetic recording medium.

When the upper face of the lower magnetic pole 7 is flat before it has formed the depressions 7a, the depressions 7a formed in the lower magnetic pole 7 in consequence of the impingement of the focussed ion beam are such that the depths thereof culminate directly below the lateral faces of the pole tip 15a and decrease in accordance as the depressions separate sidewise from the pole tip 15a. Of course, the shape in which the depressions 7a are dug does not need to be limited to that which is illustrated because it is variable with the manner of impingement of the FIB.

Figure 7:
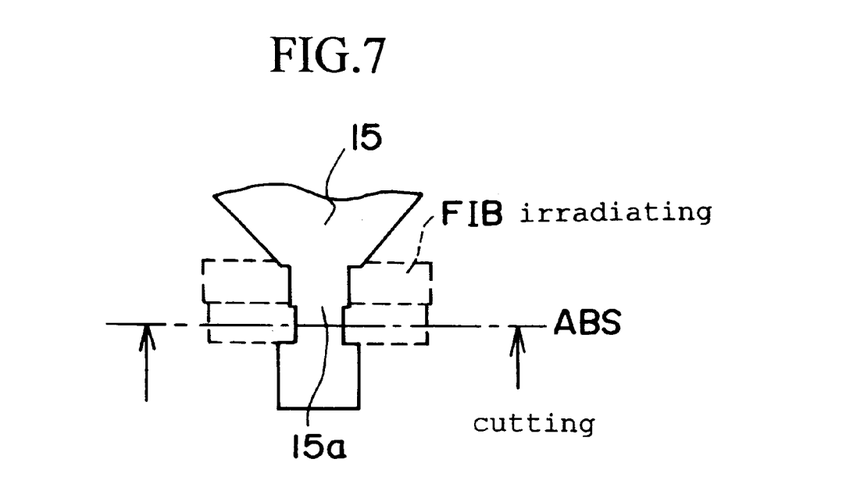
FIG. 7 is a plan view illustrating another example of trimming the upper magnetic pole of the magnetic head of this invention.

Another embodiment of this invention is illustrated in FIG. 7. In this embodiment, the pole tip 15a of the upper magnetic pole 15 is formed such that the size thereof in the direction of width of the track increases stepwise in proportion as the distance from the ABS face increases. This form can be easily produced by continuing the fabrication while gradually moving the position for exposure to the FIB. This specific form is effective in curbing the occurrence of uncalled-for saturation of magnetic pole in the part farther away from the face opposed to the ABS face.

Figure 8A:
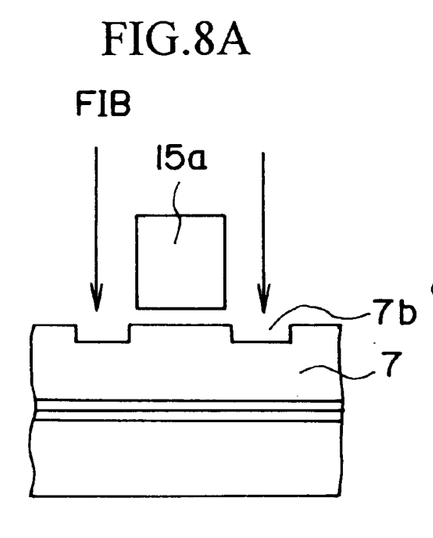
FIGS. 8A and 8B are cross sections illustrating yet another example of trimming the upper magnetic pole of the magnetic head of this invention.
Figure 8B:
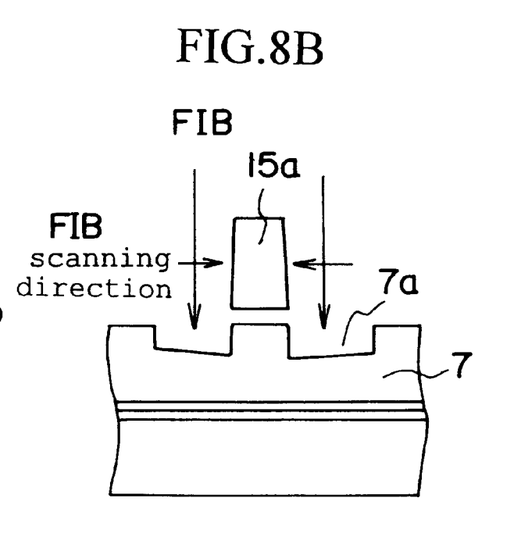

FIGS. 8A and 8B illustrate still another embodiment of this invention. This embodiment represents a case of first exposing to the FIB the lateral position of the lower magnetic pole 7 which slightly deviates by a size in the approximate range of 0.2–1 μm, for example, from the pole tip 15a of the upper magnetic pole 15 thereby digging a shallow depression 7d and then exposing the lateral part of the pole tip 15a of the upper magnetic pole 15 and the lower magnetic pole 7 to the FIB thereby trimming them. In this embodiment, the step coverage during the formation of the protective layer 16 of such material as alumina, namely the final stage of the wafer process, is further augmented because the depressions 7a in the lower magnetic pole 7 do not easily assume the bottom shape having a steep slant.

Figure 9A:
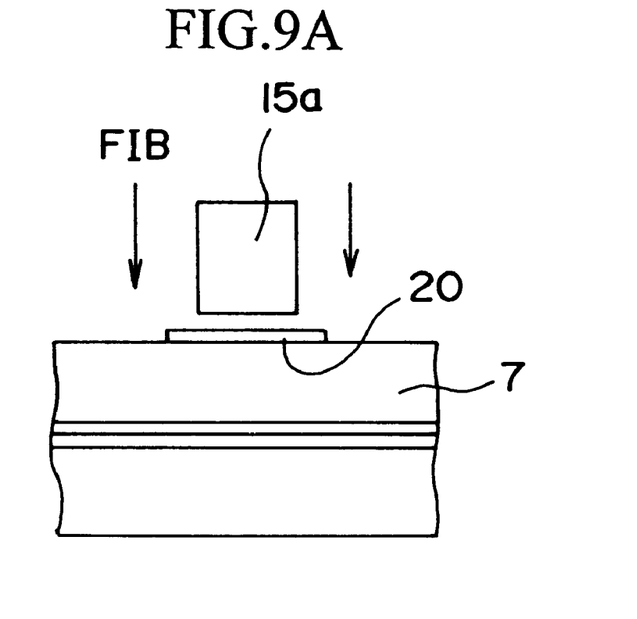
FIGS. 9A and 9B are cross sections illustrating still another example of trimming the upper magnetic pole of the magnetic head of this invention.
Figure 9B:
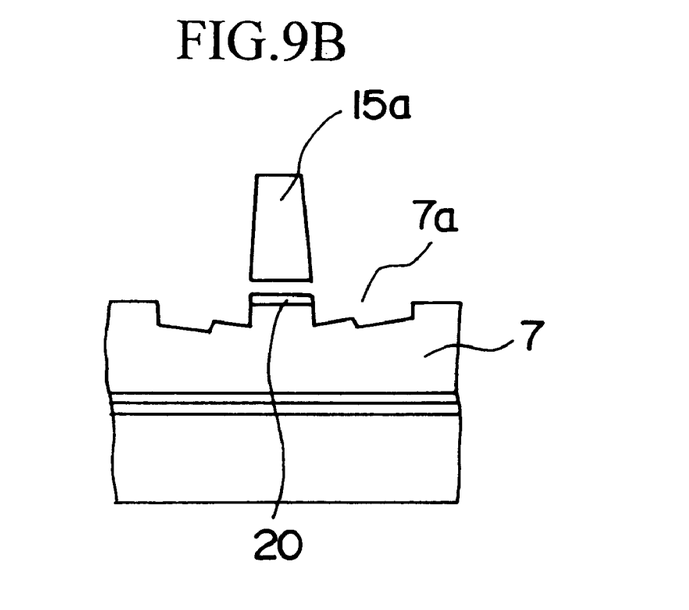

FIGS. 9A and 9B illustrates still another embodiment of this invention. This embodiment represents a case of forming the lower magnetic pole 7 with a $Ni_{82}Fe_{18}$ film (saturated magnetic flux density 1 TESLA (T) and specific resistance 18 $\mu\Omega$cm) produced by plating, superposing on the lower magnetic pole 7 a highly saturated magnetic flux density pattern 20 with $Ni_{50}Fe_{50}$ film (saturated magnetic flux density 1.5 TESLAs and specific resistance 40 $\mu\Omega$cm) produced by plating directly below the pole tip 15a and the vicinity thereof (within a size in the approximate range of 0.2–1.0 $\mu$m on one side of the pole tip 5a, for example), and thereafter exposing the pole tip 15a and a projection 7b of the lower magnetic pole 7 lying thereunder to the FIB thereby substantially equalizing them in width. This embodiment, besides being effective in improving the step coverage during the formation of the protective layer 16 of such material as alumina, allows production of a magnetic head which has only small saturation of magnetic pole owing to the use of a highly saturated magnetic flux density material on the surface of the lower magnetic pole and, what is more, suffers only slight occurrence of an eddy current at a high frequency owing to the use of a material of high electric resistance. Naturally in this case, at least part of the upper magnetic pole 15 is preferred to be formed of a material of high saturation and high specific resistance. By widening the highly saturated magnetic flux density material pattern or the high electric resistance material pattern on the lower magnetic pole 7 on one side in a size in the approximate range of 0.2–1.0 $\mu$m from the pole tip 15a, the time spent for the trimming treatment can be effectively curtailed. In sole consideration of this reduction in the trimming time, a pattern made of the same material as that used in the other part of the lower magnetic pole may be adopted in the place of the highly saturated magnetic flux density pattern 20 mentioned above.

The inductive-write/MR-read composite type magnetic head 17 mentioned above is adapted for both recording and reproducing.

An attempt to form the depressions in the lower magnetic pole in a cross section of the shape of a semicircle proves unfavorable for the writing of magnetic information because the projection 7b of the lower magnetic pole 7 substantially assumes the shape of a trapezoid having a wide base such that the distribution of recording magnetic field is inevitably enlarged.

It is not inconceivable to keep the upper magnetic pole covered with a resist mask during the exposure thereof to the FIB. Since the upper magnetic pole reflecting this special measure is equal to or lower than the former embodiment using no resist mask in terms of the accuracy of alignment of position, this measure proves to be disadvantageous for the production of a magnetic head owing to the addition of the extra step of forming a resist mask pattern to the process.

For the purpose of curtailing the time spent for the operation with the FIB irradiating device mentioned above, the following process may be adopted as of the time occasioning the state illustrated in FIG. 2C.

Figure 10A:
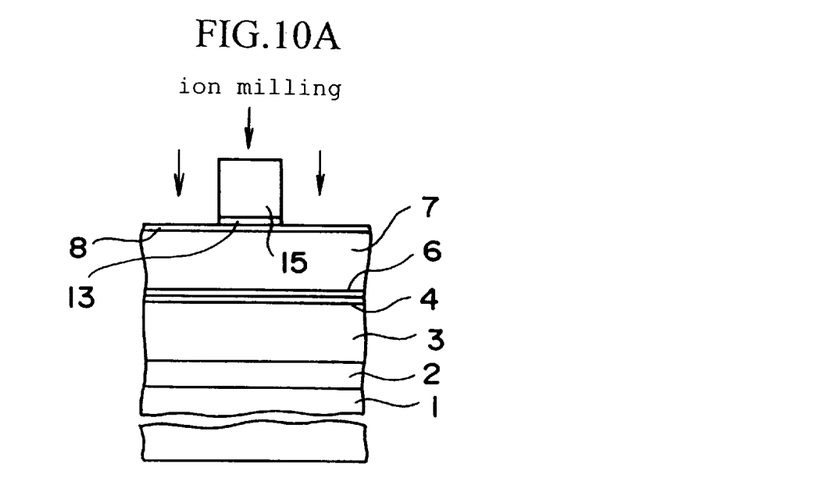
FIG. 10A to 10C are cross sections illustrating another example of a triming of a magnetic pole.

First, as illustrated in FIG. 10A, the area of an undercoating layer 13 for electroplating which is not covered with an upper magnetic pole 15 is selectively removed by ion milling. In this case, the upper magnetic pole 15 is also etched to lose thickness slightly by ion milling.

If the upper magnetic pole 15 is formed by sputtering technique, the formation of the plating base layer 13 is not needed.

Figure 10B:
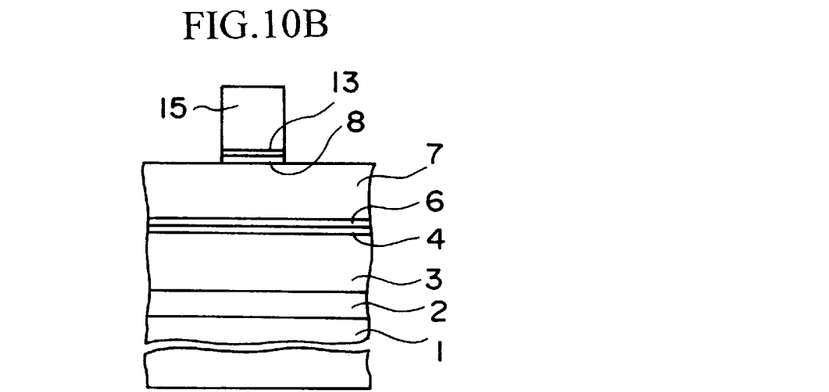

Next, as illustrated in FIG. 10B, the area of a write gap layer 8 not covered with the upper magnetic pole 15 is selectively removed. When the write gap layer 8 happens to be formed of $Al_2O_3$, the ion milling technique is adopted for the removal of the write gap layer 8. When the write gap layer 8 is formed $SiO_2$, the wet etching technique using an aqueous hydrofluoric acid or the reactive gas used by the relevent technique is incapable of etching a lower magnetic pole layer 7.

After the treatment for the removal of these layers, the undercoating layer 13 for plating and a write gap layer 18 remain only between a pole tip 15a and the lower magnetic pole 7.

Figure 10C:
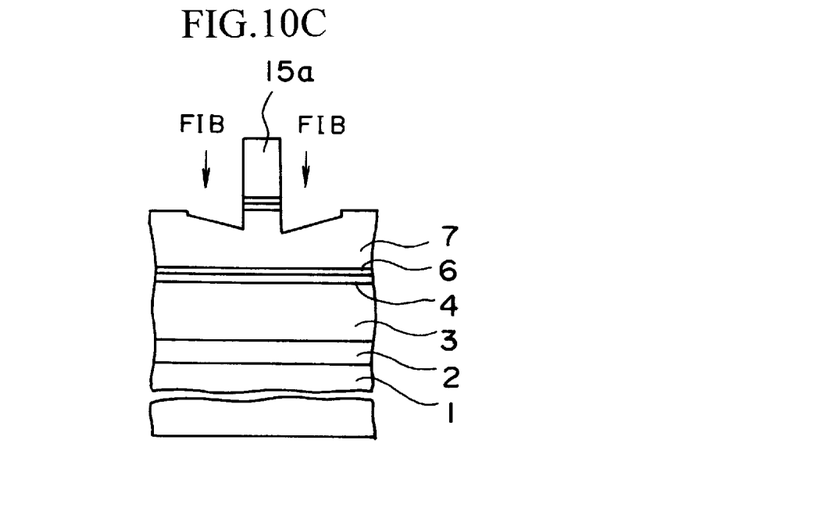
Figure 11:
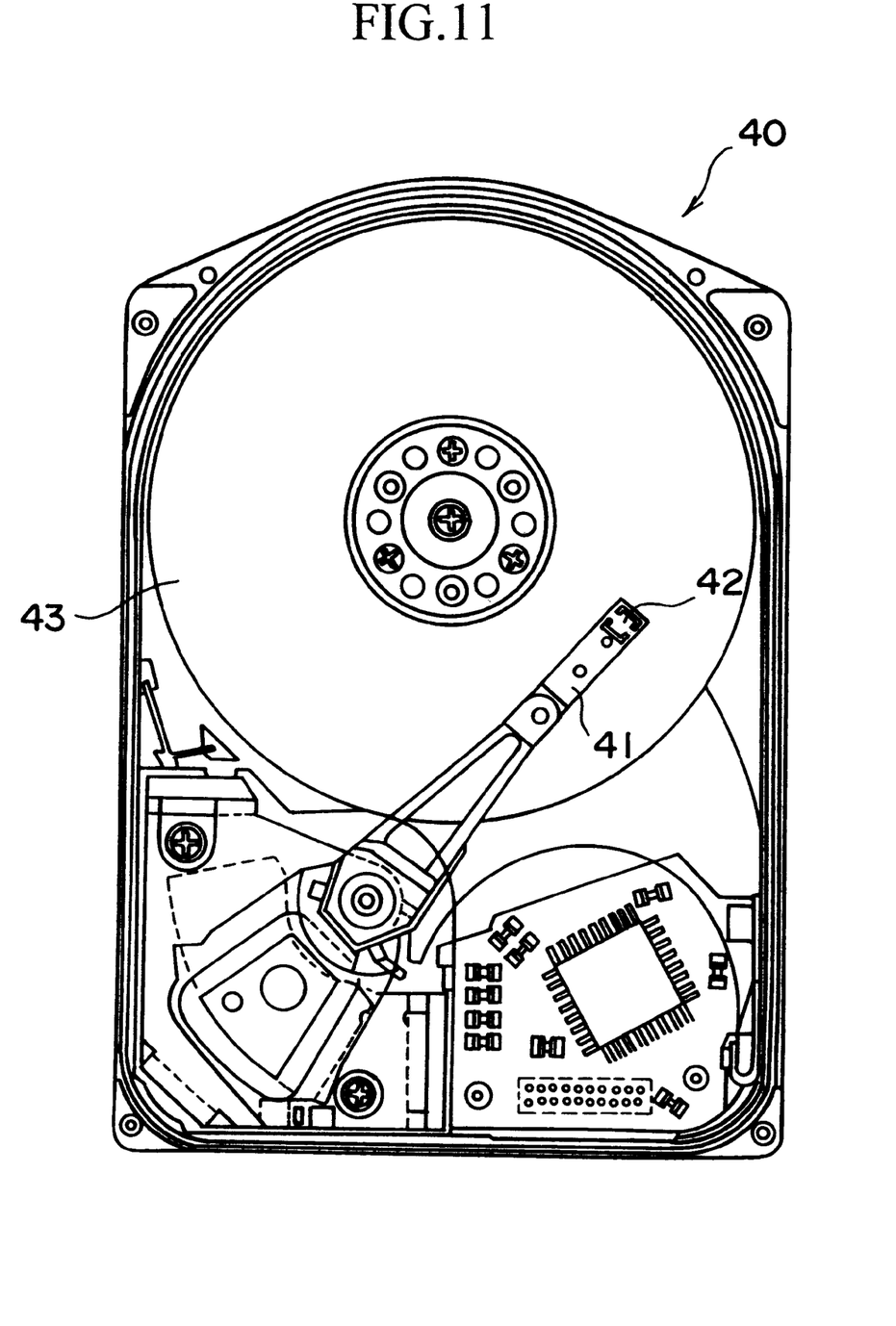
FIG. 11 is a plan view illustrating one example of the magnetic disk drive using the magnetic head of this invention.

Thereafter, as illustrated in FIG. 10C, the lateral parts of the pole tip 15a and the lower magnetic pole 7 are exposed to FIB to decrease the width between the lateral parts of the pole tip 15a and form depressed parts 7a one of each in the lower magnetic pole 7 below the opposite sides of the pole tip 15a. Then, the upper magnetic pole 15 and the lower magnetic pole 7 are covered with a protective layer.

According to the process illustrated in FIG. 10A–FIG. 10c, the time spent for the operation in the FIB irradiating device per wafer can be curtailed and consequently the number of wafers treated with the FIB irradiating device can be increased because the time for the removal of the undercoating layer 13 for plating and the write gap layer 8 by the FIB exposure is omitted as described above.

Owing to the adoption of the step of forming the depressed parts 7a in the lower magnetic pole 7 by the FIB irradiation subsequently to the removal of the undercoating layer for plating by the ion milling technique, i.e. a step of contrary to what is illustrated in FIGS. 2D and 2E, the possibility of the depth of the depressed part 7a being increased by the subsequent ion milling is nil.

If the upper magnetic pole 15 formed by the sputter technique is patterned with the photolithography method, the write gap layer 8 exposing out of the upper magnetic pole 15 is removed after the patterning of the upper magnetic pole 15 and before the FIB irradiation.

One example of the magnetic disk drive which is provided with the magnetic head described above is illustrated by a plan view of FIG. 10.

Inside the housing of a magnetic disk drive 40, a magnetic head 42 of the construction described above is attached to the leading end of an arm 41 and this arm 41 is mounted such that the leading end thereof moves on a magnetic disk 43.

The present invention contemplates forming an upper magnetic pole on a wafer, then projecting a focused ion beam in the direction of thickness of film thereby trimming the opposite lateral parts of the pole tip of the upper magnetic pole and, at the same time, forming depressed parts in the upper layer of a lower magnetic pole directly underlying the upper magnetic pole, and filling the depressed parts with a nonmagnetic protective layer as described above. When the wafer is divided so as to expose the leading end of the pole tip, therefore, the leading end of the pole tip and the vicinity thereof, namely the face of the magnetic head opposed to the magnetic recording medium, cannot suffer the occurrence of a depressed part. The face opposed to the magnetic recording medium does not allow easy adhesion of dust.

Since the upper magnetic poles and the lower magnetic poles are simultaneously trimmed while they are still parts of the integrated wafer, the magnetoresistive element which exists thereunder can be prevented from electro-static breakage by such measures as grounding the lower magnetic pole or trimming the poles from above the electroconductive film for use in electro plating the upper magnetic pole.

Further, since the focused ion beam is moved to the lateral parts of the pole tip from outside, the material of the magnetic pole scattered by the impingement of the focused ion beam does not easily adhere to the lateral part of the pole tip and, therefore, cannot degrade the accuracy of the width of the pole tip.

When the surface of the lower electrode directly underlying the pole tip of the upper magnetic pole is covered with a layer of a higher saturated density or higher resistance than in the other area, it is enabled to inhibit a change in signal due to saturation of the lower magnetic pole or prevent deterioration of the frequency characteristic due to eddy current.

When the area of the upper face of the lower magnetic pole which is opposed to the upper magnetic pole and the vicinity thereof are raised for the purpose of leveling the depressed part possibly formed in the lower magnetic pole in consequence of the exposure to the focused ion beam, the possibility of the depressed part gaining the greatest depth in the part approximating most closely to the pole tip can be prevented. When a depressed part is preparatorily formed in the area of the lower magnetic pole which is separated from the pole tip of the upper magnetic pole, this depressed part can be given an increased depth at the center and the possibility of the depressed part assuming the greatest depth in the area approximating most closely to the pole tip can be precluded.

What is claimed is:

1. A magnetic head comprising:

a lower magnetic pole formed on a wafer;

a nonmagnetic write gap layer formed on said lower magnetic pole;

an upper magnetic pole formed on said nonmagnetic write gap layer and provided with a pole tip possessing a thin leading end;

two depressed parts formed in the lateral directions from directly below the lateral sides of said pole tip and opposed to each other across areas equal in width with said pole tip;

a protective layer of a nonmagnetic insulating material adapted to fill said depressed parts and, at the same time, cover said upper magnetic pole and said lower magnetic pole; and a coil nipped between the opposed parts of a nonmagnetic insulating layer interposed between said upper magnetic pole and said lower magnetic pole.

2. A magnetic head according to claim 1, wherein said depressed parts have the greatest depth in the parts closely approximating the lateral sides of said pole tip.

3. A magnetic head according to claim 1, wherein the upper layer parts of said lower magnetic pole in the areas opposed to said pole tip of said upper magnetic pole have a higher saturated magnetic flux density than the other areas of said lower magnetic pole.

4. A magnetic head according to claim 1, wherein the upper layer parts of said lower magnetic pole in the areas opposed to said pole tip of said upper magnetic pole have a higher electric resistance than the other areas of said lower magnetic pole.

5. A magnetic head according to claim 1, wherein said pole tip is converged stepwise in the direction of the leading end thereof.

* * * * *